US010484723B2

(12) United States Patent
Martin et al.

(10) Patent No.: US 10,484,723 B2
(45) Date of Patent: *Nov. 19, 2019

(54) STREAM MESSAGING FOR PROGRAM STREAM AUTOMATION

(71) Applicant: Disney Enterprises, Inc., Burbank, CA (US)

(72) Inventors: Michael Martin, Los Angeles, CA (US); Daniel Siewers, Valencia, CA (US); William Hooper, Glendale, CA (US); David Potter, Altadena, CA (US); Richard Hill, Glendale, CA (US); Michael Strein, Bohemia, NY (US); Kenneth Michel, Brightwaters, NY (US); Alfredo Vincenty, Valencia, CA (US); James Casabella, La Crescenta, CA (US); David Converse, Valencia, CA (US); Guy Beverlin, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,039

(22) Filed: Oct. 3, 2017

(65) Prior Publication Data

US 2018/0027263 A1    Jan. 25, 2018

Related U.S. Application Data

(63) Continuation of application No. 13/527,520, filed on Jun. 19, 2012, now Pat. No. 9,888,265.

(Continued)

(51) Int. Cl.
*H04N 21/00*     (2011.01)
*H04N 21/44*     (2011.01)
(Continued)

(52) U.S. Cl.
CPC .......... *H04N 21/00* (2013.01); *H04N 21/234* (2013.01); *H04N 21/236* (2013.01); *H04N 21/23424* (2013.01); *H04N 21/44016* (2013.01)

(58) Field of Classification Search
CPC combination set(s) only.
See application file for complete search history.

(56) References Cited

U.S. PATENT DOCUMENTS 7,889,964 B1 *  2/2011  Barton ................. G11B 27/034
                                                  386/240
2002/0147634 A1 * 10/2002 Jacoby ................... G06Q 30/02
                                                  705/14.73

(Continued)

*Primary Examiner* — Alexander Gee
(74) *Attorney, Agent, or Firm* — Farjami & Farjami LLP

(57) ABSTRACT

There is provided a content automation system and a method for use by the content automation system for issuing a content management message for use in a program stream. In one implementation, such a content automation system comprises a processor and a memory, and a stream messaging module residing in the memory. The stream messaging module is configured to issue the content management message by embedding a command sequence as metadata in a container data structure, and inserting the container data structure into the program stream. The command sequence authorizes a replacement of program stream content.

12 Claims, 18 Drawing Sheets

Related U.S. Application Data

(60) Provisional application No. 61/594,264, filed on Feb. 2, 2012.

(51) Int. Cl.
*H04N 21/236* (2011.01)
*H04N 21/234* (2011.01)

(56) References Cited

U.S. PATENT DOCUMENTS

| | | | | |
|---|---|---|---|---|
| 2005/0149968 | A1* | 7/2005 | Konig | G06K 9/00744 725/32 |
| 2009/0044217 | A1* | 2/2009 | Lutterbach | H04H 20/103 725/34 |
| 2009/0307732 | A1* | 12/2009 | Cohen | G06Q 30/02 725/87 |
| 2012/0304224 | A1* | 11/2012 | Hines | H04N 21/44008 725/34 |
| 2013/0185749 | A1* | 7/2013 | Bill | G06Q 30/02 725/32 |

* cited by examiner

Fig. 3A

332-1

```
 1  SCTE104_CURRENT_TIME_MESSAGE
 2
 3  SCTE104_CURRENT_TIME_MESSAGE
 4     //          Data                Bytes  Value       Comments
 5     {
 6     SMPTE 2010 SCTE Message Header (Shown for reference only; Generated by VANC Inserter)
 7     DID                              1     0x41        Ancillary Packet Data ID
 8     SDID                             1     0x07        Ancillary Packet Secondary Data ID
 9     DataCount                        1     0x1A        Ancillary Packet Data Count
10     PayloadDesc                      1     0x04        Payload Descriptor per SMPTE 2010
11
12     SCTE 104 Message Body
13     Reserved1                        1     0xFF        Beginning of
14                                                        multiple_operation_message
15     Reserved2                        1     0xFF        per SCTE 104 Table 7-2
16     MsgSizeHigh                      1     0x00        Message Size [high order byte]
17     MsgSizeLow                       1     0x19        Message Size [low order byte]
18     ProtocolVersion                  1     0x00        Protocol Version
19     AS_Index                         1     0x00        Automation System Index
20     MessageNumber                    1     calculated  message_number
21     DPI_PID_High                     1     0x00        DPI_PID_index [high order byte]
22     DPI_PID_Low                      1     0x00        DPI_PID_index [low order byte]
23     SCTE35_ProtocolVersion           1     0x00        SCTE35_protocol_version
24
25     TimeStamp.time_type              1     0x02        time_type = 02 -> SMPTE time code
26     TimeStamp.hours                  1     0-23        current time at program
27                                                        stream origin
28     TimeStamp.minutes                1     0-59
29     TimeStamp.seconds                1     0-59
30     TimeStamp.frames                 1     0-29
31
32     NumberOfOps                      1     0x01        current time command only
33
```

Fig. 3B

332-2

```
1    SCTE104_CURRENT_TIME_MESSAGE (continued)
2        // Current Time Command
3        //         Data              Bytes  Value    Comments
4        OpId1High                    1      0x81     opID [high order byte]
5        OpId1Low                     1      0x50     opID [low order byte]
6        Op1DataLengthHigh            1      0x00     data_length [high order byte]
7        Op1DataLengthLow             1      0x05     data_length [low order byte]
8
9        proprietary_id[4]            4      'DATG'   SMPTE registered ID
10       proprietary_command          1      0x05     current time
11       proprietary_data {}          0               no data
12       _____
13       VANC Checksum (Shown for reference only; Generated by VANC Inserter)
14       VANC_checksum                9 bits  calculated per SMPTE ST 291
15     }
```

Fig. 5A

```
1   SCTE104_EVENT_NOTIFICATION_MESSAGE                                        534-1
2
3   SCTE104_EVENT_NOTIFICATION_MESSAGE
4   //          Data                    Bytes  Value      Comments
5   {
6       SMPTE 2010 SCTE Message Header (Shown for reference only; Generated by VANC Inserter)
7       DID                             1      0x41       Ancillary Packet Data ID
8       SDID                            1      0x07       Ancillary Packet Secondary Data ID
9       DataCount                       1      0x5C       Ancillary Packet Data Count
10      PayloadDesc                     1      0x08       Payload Descriptor per SMPTE 2010
11
12      SCTE 104 Message Body
13      Reserved1                       1      0xFF       Beginning of
14                                                        multiple_operation_message
15      Reserved2                       1      0xFF       per SCTE 104 Table 7-2
16      MsgSizeHigh                     1      0x00       Message Size [high order byte]
17      MsgSizeLow                      1      0x5B       Message Size [low order byte]
18      ProtocolVersion                 1      0x00       Protocol Version
19      AS_Index                        1      0x00       Automation System Index
20      MessageNumber                   1      calculated message_number
21      DPI_PID_High                    1      0x00       DPI_PID_index [high order byte]
22      DPI_PID_Low                     1      0x00       DPI_PID_index [low order byte]
23      SCTE35_ProtocolVersion          1      0x00       SCTE35_protocol_version
24
25      TimeStamp.time_type             1      0x02       time_type = 02 -> SMPTE time code
26      TimeStamp.hours                 1      0-23       current time at pgm stream origin
27      TimeStamp.minutes               1      0-59
28      TimeStamp.seconds               1      0-59
29      TimeStamp.frames                1      0-29
30
31      NumberOfOps                     1      0x01       event notification only
```

```
1    SCTE104_EVENT NOTIFICATION_MESSAGE (continued)
2    // Event Notification Command Section
3    //              Data           Bytes  Value         Comments
4    OpId1High                      1      0x81          opID [high order byte]
5    OpId1Low                       1      0x50          opID [low order byte]
6    OpIDDataLengthHigh             1      0x00          data_length [high order byte]
7    OpIDDataLengthLow              1      0x47          data_length [low order byte]
8
9    proprietary_id[4]              4      'DATG'        SMPTE registered ID
10   proprietary_command            1      0x01          event notification command
11
12   proprietary_data                                    event notification
13                                                      command parameters
14   {
15       EventStartDate             10                   ISO 8601 program start date
16                                                       (yyyy-mm-dd)
17
18       EventStart.hours           1      0-23          current event start time address
19       EventStart.minutes         1      0-59
20       EventStart.seconds         1      0-59
21       EventStart.frames          1      0-29          Frame pairs for 720p
22
23       EventDur.hours             1      0-23          current event scheduled duration
24       EventDur.minutes           1      0-59
25       EventDur.seconds           1      0-59
26       EventDur.frames            1      0-29          Frame pairs for 720p
27
28       ProgramID                  16     character     program ID of the event
29                                         string        just started
30       ProgramDescription         32     character     description of the event
31                                         string        just started
32   }
33   _____
34   VANC Checksum (Shown for reference only; Generated by VANC Inserter)
35   VANC_checksum                         9 bits calculated per SMPTE ST 291
36   }
```

Fig. 7A

736

| | | | | | |
|---|---|---|---|---|---|
| 1 | SCTE104_REPLACE_AD_MESSAGE | | | | |
| 2 | | | | | 736-1 |
| 3 | SCTE104_REPLACE_AD_MESSAGE | | | | |
| 4 | // | Data | Bytes | Value | Comments |
| 5 | { | | | | |
| 6 | SMPTE 2010 SCTE Message Header (Shown for reference only; Generated by VANC Inserter) | | | | |
| 7 | | DID | 1 | 0x41 | Ancillary Packet Data ID |
| 8 | | SDID | 1 | 0x07 | Ancillary Packet Secondary Data ID |
| 9 | | DataCount | 1 | 0x99 | Ancillary Packet Data Count |
| 10 | | PayloadDesc | 1 | 0x08 | Payload Descriptor per SMPTE 2010 |
| 11 | | | | | |
| 12 | | SCTE 104 Message Body | | | |
| 13 | | Reserved1 | 1 | 0xFF | Beginning of |
| 14 | | | | | multiple_operation_message |
| 15 | | Reserved2 | 1 | 0xFF | per SCTE 104 Table 7-2 |
| 16 | | MsgSizeHigh | 1 | 0x00 | Message Size [high order byte] |
| 17 | | MsgSizeLow | 1 | 0x98 | Message Size [low order byte] |
| 18 | | ProtocolVersion | 1 | 0x00 | Protocol Version |
| 19 | | AS_Index | 1 | 0x00 | Automation System Index |
| 20 | | MessageNumber | 1 | calculated | message_number |
| 21 | | DPI_PID_High | 1 | 0x00 | DPI_PID_index [high order byte] |
| 22 | | DPI_PID_Low | 1 | 0x00 | DPI_PID_index [low order byte] |
| 23 | | SCTE35_ProtocolVersion | 1 | 0x00 | SCTE35_protocol_version |
| 24 | | | | | |
| 25 | | TimeStamp.time_type | 1 | 0x02 | time_type = 02 -> SMPTE time code |
| 26 | | TimeStamp.hours | 1 | 0-23 | current time at program |
| 27 | | | | | stream origin |
| 28 | | TimeStamp.minutes | 1 | 0-59 | |
| 29 | | TimeStamp.seconds | 1 | 0-59 | |
| 30 | | TimeStamp.frames | 1 | 0-29 | |
| 31 | | | | | |
| 32 | | NumberOfOps | 1 | 0x02 | event notification plus command |

| | | | | |
|---|---|---|---|---|
| 1 | SCTE104_REPLACE_AD_MESSAGE (continued) | | | |
| 2 | // Event Notification Command Section | | | |
| 3 | //  Data | Bytes | Value | Comments |
| 4 | OpId1High | 1 | 0x81 | opID [high order byte] |
| 5 | OpId1Low | 1 | 0x50 | opID [low order byte] |
| 6 | Op1DataLengthHigh | 1 | 0x00 | data_length [high order byte] |
| 7 | Op1DataLengthLow | 1 | 0x47 | data_length [low order byte] |
| 8 | | | | |
| 9 | proprietary_id[4] | 4 | 'DATG' | SMPTE registered ID |
| 10 | proprietary_command | 1 | 0x01 | event notification command |
| 11 | | | | |
| 12 | proprietary_data | | | event notification |
| 13 | | | | command parameters |
| 14 | { | | | |
| 15 | EventStartDate | 10 | | ISO 8601 program start date |
| 16 | | | | (yyyy-mm-dd) |
| 17 | | | | |
| 18 | EventStart.hours | 1 | 0-23 | current event start time address |
| 19 | EventStart.minutes | 1 | 0-59 | |
| 20 | EventStart.seconds | 1 | 0-59 | |
| 21 | EventStart.frames | 1 | 0-29 | Frame pairs for 720p |
| 22 | | | | |
| 23 | EventDur.hours | 1 | 0-23 | current event scheduled duration |
| 24 | EventDur.minutes | 1 | 0-59 | |
| 25 | EventDur.seconds | 1 | 0-59 | |
| 26 | EventDur.frames | 1 | 0-29 | Frame pairs for 720p |
| 27 | | | | |
| 28 | ProgramID | 16 | character | program ID of the event |
| 29 | | | string | just started |
| 30 | ProgramDescription | 32 | character | description of the event |
| 31 | | | string | just started |
| 32 | } | | | |

```
1   SCTE104_REPLACE_AD_MESSAGE (continued)
2       // Replace Ad Command Section
3       //           Data              Bytes   Value       Comments
4       OpId2High                      1       0x81        opID [high order byte]
5       OpId2Low                       1       0x50
6       Op2DataLengthHigh              1       0x00        data_length [high order byte]
7       Op2DataLengthLow               1       0x39        data_length [low order byte]
8
9       proprietary_id[4]              4       'OATG'      SMPTE registered ID
10      proprietary_command            1       0x02        replace ad
11      proprietary_data
12      {
13        PodDur.hours                 1       0-23        duration of ad pod to be replaced
14        PodDur.minutes               1       0-59
15        PodDur.seconds               1       0-59
16        PodDur.frames                1       0-29        Frame pairs for 720p
17
18        LongFormProgramID            16      character   program ID of the current
19                                             string      long-form program
20        LongFormProgramDescription   32      character   description of the current
21                                             string      long-form program
22      }
23      _____
24      VANC Checksum (Shown for reference only: Generated by VANC Inserter)
25      VANC_checksum                          9 bits calculated per SMPTE ST 291
26      }
```

1 SCTE104_REPLACE_CONTENT_MESSAGE
2                                                                                     936-1
3 SCTE104_REPLACE_CONTENT_MESSAGE
4     //          Data              Bytes  Value      Comments
5     {
6       SMPTE 2010 SCTE Message Header (Shown for reference only: Generated by VANC Inserter)
7       DID                           1    0x41       Ancillary Packet Data ID
8       SDID                          1    0x07       Ancillary Packet Secondary Data ID
9       DataCount                     1    0x7D       Ancillary Packet Data Count
10      PayloadDesc                   1    0x08       Payload Descriptor per SMPTE 2010
11
12      SCTE 104 Message Body
13      Reserved1                     1    0xFF       Beginning of
14                                                    multiple_operation_message
15      Reserved2                     1    0xFF       per SCTE 104 Table 7-2
16      MsgSizeHigh                   1    0x00       Message Size [high order byte]
17      MsgSizeLow                    1    0x7C       Message Size [low order byte]
18      ProtocolVersion               1    0x00       Protocol version
19      AS_Index                      1    0x00       Automation System Index
20      MessageNumber                 1    calculated message_number
21      DPI_PID_High                  1    0x00       DPI_PID_index [high order byte]
22      DPI_PID_Low                   1    0x00       DPI_PID_index [low order byte]
23      SCTE35_ProtocolVersion        1    0x00       SCTE35_protocol_version
24
25      TimeStamp.time_type           1    0x02       time_type = 02 -> SMPTE time code
26      TimeStamp.hours               1    0-23       current time at program
27                                                    stream origin
28      TimeStamp.minutes             1    0-59
29      TimeStamp.seconds             1    0-59
30      TimeStamp.frames              1    0-29
31
32      NumberOfOps                   1    0x02       event notification plus command

```
1    SCTE104_REPLACE_CONTENT_MESSAGE (continued)
2        // Event Notification Command Section
3        //              Data              Bytes  Value            Comments
4        OpId1High                         1      0x81             opID [high order byte]
5        OpId1Low                          1      0x50             opID [low order byte]
6        Op1DataLengthHigh                 1      0x00             data_length [high order byte]
7        Op1DataLengthLow                  1      0x47             data_length [low order byte]
8
9        proprietary_id[4]                 4      'DATG'           SMPTE registered ID
10       proprietary_command               1      0x01             event notification command
11
12       proprietary_data                                          event notification
13                                                                 command parameters
14       {
15           EventStartDate                10                      ISO 8601 program start date
16                                                                 (yyyy-mm-dd)
17
18           EventStart.hours              1      0-23             current event start time address
19           EventStart.minutes            1      0-59
20           EventStart.seconds            1      0-59
21           EventStart.frames             1      0-29             Frame pairs for 720p
22
23           EventDur.hours                1      0-23             current event scheduled duration
24           EventDur.minutes              1      0-59
25           EventDur.seconds              1      0-59
26           EventDur.frames               1      0-29             Frame pairs for 720p
27
28           ProgramID                     16     character        program ID of the event
29                                                string           just started
30           ProgramDescription            32     character        description of the event
31                                                string           just started
32       }
```

```
1    SCTE104_REPLACE_CONTENT_MESSAGE (continued)
2      // Replace Content Command Section
3      //          Data              Bytes  Value      Comments
4      OpId2High                     1      0x81       opID [high order byte]
5      OpId2Low                      1      0x50       opID [low order byte]
6      Op2DataLengthHigh             1      0x00       data_length [high order byte]
7      Op2DataLengthLow              1      0x1D       data_length [low order byte]
8
9      proprietary_id[4]             4      'DATG'     SMPTE registered ID
10     proprietary_command           1      0x03       replace content
11     proprietary_data                                content replacement
12                                                     command parameters
13     {
14       ReplLength.hours            1      0-23       duration of program
15                                                     block to be replaced
16       ReplLength.minutes          1      0-59
17       ReplLength.seconds          1      0-59
18       ReplLength.frames           1      0-29       Frame pairs for 720p
19
20       Offset.hours                1      0-23       offset from the beginning
21                                                     of the replacement content
22                                                     from which to begin playback
23                                                     of that content
24       Offset.minutes              1      0-59
25       Offset.seconds              1      0-59
26       Offset.frames               1      0-29       Frame pairs for 720p
27
28       ReplProgramID               16     character  program ID of the
29                                          string     replacement content
30     }
31     _____
32     VANC Checksum (Shown for reference only; Generated by VANC Inserter)
33     VANC_checksum                        9 bits calculated per SMPTE ST 291
34   }
```

Fig. 10A

1036-1

```
1   SCTE104_REJOIN_MAIN_MESSAGE
2
3   SCTE104_REJOIN_MAIN_MESSAGE
4       //          Data                    Bytes   Value       Comments
5       {
6       SMPTE 2010 SCTE Message Header (Shown for reference only; Generated by VANC Inserter)
7       DID                                 1       0x41        Ancillary Packet Data ID
8       SDID                                1       0x07        Ancillary Packet Secondary Data ID
9       DataCount                           1       0x65        Ancillary Packet Data Count
10      PayloadDesc                         1       0x08        Payload Descriptor per SMPTE 2010
11
12      SCTE 104 Message Body
13      Reserved1                           1       0xFF        Beginning of
14                                                              multiple_operation_messa
15      Reserved2                           1       0xFF        per SCTE 104 Table 7-2
16      MsgSizeHigh                         1       0x00        Message Size [high order byte]
17      MsgSizeLow                          1       0x64        Message Size [low order byte]
18      ProtocolVersion                     1       0x00        Protocol Version
19      AS_Index                            1       0x00        Automation System Index
20      MessageNumber                       1       calculated  message_number
21      DPI_PID_High                        1       0x00        DPI_PID_index [high order byte]
22      DPI_PID_Low                         1       0x00        DPI_PID_index [low order byte]
23      SCTE35_ProtocolVersion              1       0x00        SCTE35_protocol_version
24
25      TimeStamp.time_type                 1       0x02        time_type = 02 -> SMPTE time code
26      TimeStamp.hours                     1       0-23        current time at program
27                                                              stream origin
28      TimeStamp.minutes                   1       0-59
29      TimeStamp.seconds                   1       0-59
30      TimeStamp.frames                    1       0-29
31
32      NumberOfOps                         1       0x02        event notification plus command
```

Fig. 10B 1036-2

```
1   SCTE104_REJOIN_MAIN_MESSAGE (continued)
2       // Event Notification Command Section
3       //           Data                    Bytes  Value           Comments
4       OpId1High                            1      0x81            opID [high order byte]
5       OpId1Low                             1      0x50            opID [low order byte]
6       OpIDDataLengthHigh                   1      0x00            data_length [high order byte]
7       OpIDDataLengthLow                    1      0x47            data_length [low order byte]
8
9       proprietary_id[4]                    4      'DATG'          SMPTE registered ID
10      proprietary_command                  1      0x01            event notification command
11
12      proprietary_data                                            event notification
13                                                                  command parameters
14      {
15          EventStartDate                   10                     ISO 8601 program start date
16                                                                  (yyyy-mm-dd)
17
18          EventStart.hours                 1      0-23            current event start time address
19          EventStart.minutes               1      0-59
20          EventStart.seconds               1      0-59
21          EventStart.frames                1      0-29            Frame pairs for 720p
22
23          EventDur.hours                   1      0-23            current event scheduled duration
24          EventDur.minutes                 1      0-59
25          EventDur.seconds                 1      0-59
26          EventDur.frames                  1      0-29            Frame pairs for 720p
27
28          ProgramID                        16     character       program ID of the event
29                                                  string          just started
30          ProgramDescription               32     character       description of the event
31                                                  string          just started
32      }
```

Fig. 10C

1036-3

```
1    SCTE104_REJOIN_MAIN_MESSAGE (continued)
2    // Rejoin Main Command Section
3    //           Data              Bytes   Value    Comments
4    OpId2High                      1       0x81     opID [high order byte]
5    OpId2Low                       1       0x50     opID [low order byte]
6    Op2DataLengthHigh              1       0x00     data_length [high order byte]
7    Op2DataLengthLow               1       0x05     data_length [low order byte]
8
9    proprietary_id[4]              4       'DATG'   SMPTE registered ID
10   proprietary_command            1       0x04     rejoin main
11   proprietary_data {}            0                no data
12   ─────────────────────────────────────────────────────────────────────
13   VANC Checksum (Shown for reference only: Generated by VANC Inserter)
14   VANC_checksum                  9 bits  calculated per SMPTE ST 291
15   }
```

STREAM MESSAGING FOR PROGRAM STREAM AUTOMATION

RELATED APPLICATIONS

The present application is a Continuation of U.S. application Ser. No. 13/527,520, filed Jun. 19, 2012, which claims the benefit of and priority to a provisional application entitled "TV+ Broadcast Stream Metadata," Ser. No. 61/594,264 filed on Feb. 2, 2012. The disclosure in this provisional application is hereby incorporated fully by reference into the present application.

BACKGROUND

Changes in the way that media content, such as television (TV) program content for example, can be accessed by consumers has given those consumers a level of choice over their entertainment options that were unavailable to previous generations of TV viewers. Due, for example, to technology innovations enabling consumers to access TV program content using platforms other than traditional TV sets and through distribution channels other than traditional TV broadcasts, viewers now have considerable control over where and by what means they will view their programming of choice. For instance, the ever-increasing variety of program content available over the Internet has enabled viewers to selectively view TV program content using a personal computer (PC) or gaming platform at home, rather than through use of a traditional home based TV set, or through use of a mobile communication device while traveling or otherwise away from home.

The increased viewing options for consumers of TV program content have created significant challenges for content providers attempting to generate revenue though use of advertising or promotions typically delivered with the program content. For example, contractual agreements covering compensation for advertising delivered over a particular distribution channel, such as a linear TV broadcast, may not apply when the same advertising content is delivered using an alternative distribution channel, such as the Internet. Moreover, Internet Protocol (IP) distribution channels offer the hitherto largely unrealized potential to provide individually targeted advertising and/or promotional content to consumers on a household-by-household or viewer-by-viewer basis.

SUMMARY

There are provided methods for use by a content automation system for issuing content management messages for use in a program stream, substantially as shown in and/or described in connection with at least one of the figures, and as set forth more completely in the claims.

BRIEF DESCRIPTION OF THE DRAWINGS

FIG. 3A shows a first portion of an exemplary content management message template;

FIG. 3B shows a second portion of the exemplary content management message template of FIG. 3A;

FIG. 5A shows a first portion of another exemplary content management message template;

FIG. 5B shows a second portion of the exemplary content management message template of FIG. 5A;

FIG. 7A shows a first portion of yet another exemplary content management message template;

FIG. 7B shows a second portion of the exemplary content management message template of FIG. 7A;

FIG. 7C shows a third portion of the exemplary content management message template of FIGS. 7A and 7B;

FIG. 9A shows a first portion of another exemplary content management message template corresponding to the flowchart of FIG. 8;

FIG. 9B shows a second portion of the exemplary content management message template of FIG. 9A;

FIG. 9C shows a third portion of the exemplary content management message template of FIGS. 9A and 9B;

FIG. 10A shows a first portion of yet another exemplary content management message template corresponding to the flowchart of FIG. 8;

FIG. 10B shows a second portion of the exemplary content management message template of FIG. 10A; and FIG. 10C shows a third portion of the exemplary content management message template of FIGS. 10A and 10B.

DETAILED DESCRIPTION

Figure 1:
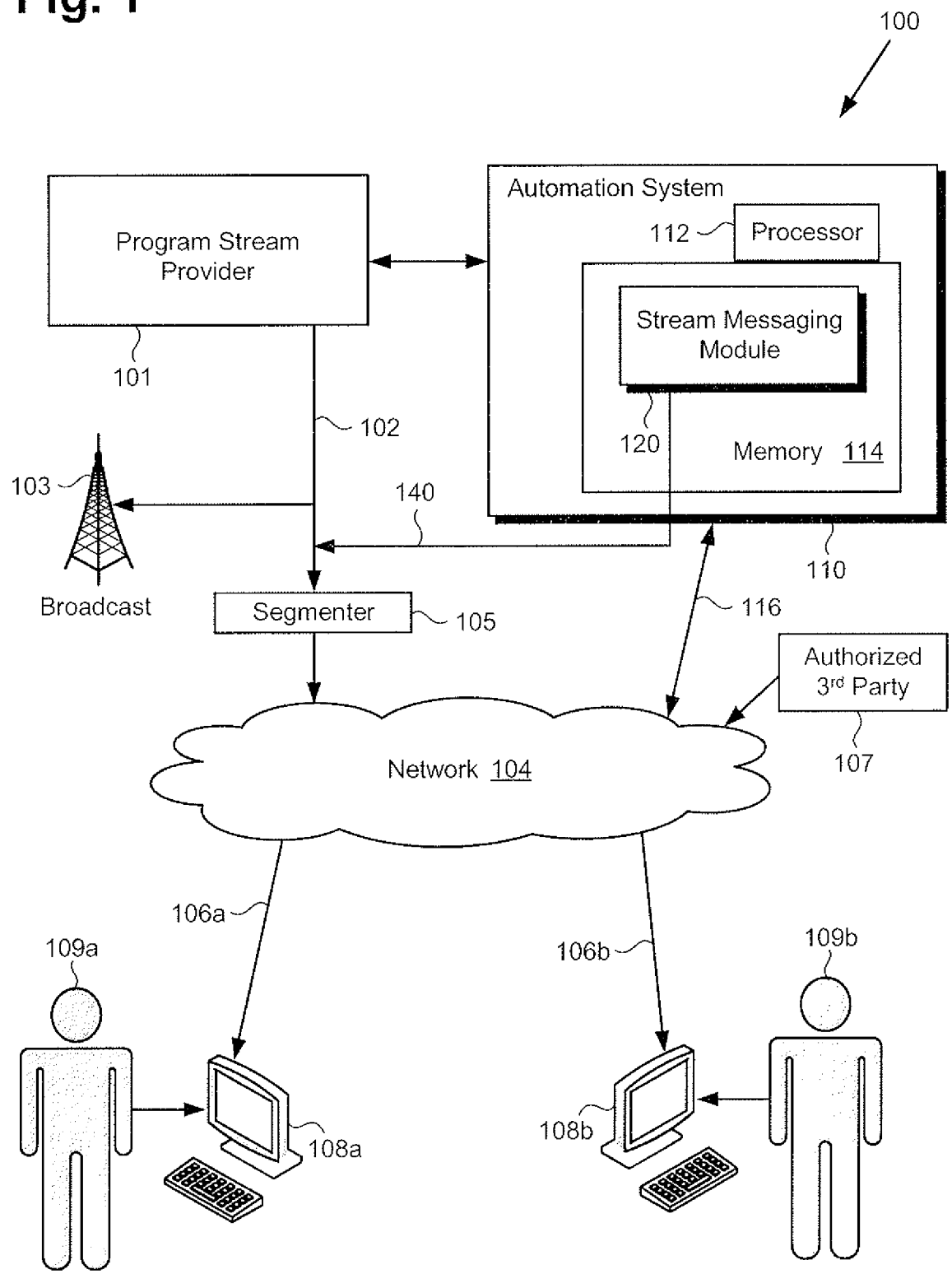
FIG. 1 shows a diagram of an exemplary system for issuing content management messages for use in a program stream.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, the increased viewing options for consumers of television (TV) program content enabled by advances in technology have created significant challenges for content providers attempting to generate revenue though advertising and promotions. For example, and as also noted above, contractual agreements covering compensation for advertising delivered as part of a linear TV broadcast may not apply when the same advertising content is delivered using an alternative distribution channel, such as the Internet. In addition, there may be other types of content included in a linear TV broadcast for which the TV broadcaster does not have Internet distribution rights. By way of example, Internet distribution rights for many sporting events are controlled by the sports league or team, rather than the TV broadcaster.

According to various implementations of the present inventive concepts, a content automation system utilized in conjunction with provision of a media content stream, such as a linear TV program stream, is configured to issue a variety of content management messages. As a result, events within the program stream, such as advertising content, program content, promotions, and the like, can be dynamically replaced or otherwise modified during delivery of the program stream. Consequently, implementations of the present inventive concepts can be used to enable locally targeted or even individually targeted distribution of program content and/or promotions. That is to say, implementations of the present concepts can advantageously enable household-by-household or viewer-by-viewer targeting of advertising and/or promotions.

FIG. 1 shows a diagram of an exemplary system for issuing content management messages for use in a program stream. As shown in FIG. 1, media distribution environment 100 includes automation system 110 including processor 112 and stream messaging module 120 stored in memory 114. Also shown in FIG. 1 are program stream provider 101 interactively linked with automation system 110, program stream 102, broadcasting platform 103, and content management message 140 provided by automation system 110 for insertion into program stream 102. In addition, FIG. 1 shows communication network 104, segmenter 105 configured to adapt program stream 102 for distribution over communication network 104, and network link 116 connecting automation system 110 to communication network 104. As further shown in FIG. 1, media distribution environment 100 also includes authorized third party 107, channel streams 106a and 106b corresponding to program stream 102, client systems 108a and 108b, and viewers 109a and 109b using respective client systems 108a and 108b to receive respective channel streams 106a and 106b.

According to the implementation of FIG. 1, automation system 110 may utilize processor 112 and stream messaging module 120 in memory 114 to generate one or more of a variety of content management messages, represented by content management message 140, to enable dynamic modification of program stream 102. For example, stream messaging module 120 may be configured to issue content management message 140 authorizing replacement of program stream content, such as one or more of advertising content, program content, such as a TV program episode or a segment of an episode, or promotional content within program stream 102. Moreover, in some implementations, stream messaging module 120 may issue content management message 140 specifying intra-program content replacement, for example through partial substitution of, or diversion away from, a portion of the content included in program stream 102.

The dynamic modification of program stream 102, enabled by insertion of content management message 140 into program stream 102, may be performed by one or more authorized third parties, represented by authorized third party 107, and may be mediated through communication network 104. As a result regional, local, household-by-household or even viewer-by-viewer customization of channel streams 106a and 106b may be achieved.

In one implementation, for example, program stream provider 101 may be a media entity providing TV content as program stream 102. Program stream 102 may be a linear TV program stream, for example, including a high-definition (HD) or standard-definition (SD) baseband video signal with embedded audio, captions, time code, and other ancillary metadata, such as ratings and/or parental guidelines. In some implementations, program stream 102 may include multiple audio tracks, and may utilize secondary audio programming (SAP) and/or Descriptive Video Service (DVS), for example. Program stream 102 may be broadcast to a traditional TV audience using broadcasting platform 103, which may correspond to a conventional cable and/or satellite network, for example. In addition, program stream provider 101 may find it advantageous or desirable to make programming content from program stream 102 available via an alternative distribution channel, such as communication network 104, which may comprise a packet network, for example, such as the Internet.

Program stream provider 101 may also deem it advantageous or desirable to provide the programming content in program stream 102 over communication network 104 substantially concurrently with its provision using broadcasting platform 103. In addition, program stream provider 101 may choose to selectively replace one or more content features in program stream 102, such as program episodes, advertisements or blocks or advertising, or promotions, based on detectable user preferences of viewers 109a and 109b. Alternatively, or in addition, one or more content features in program stream 102 may be replaced due to business requirements related to distribution rights, and/or business choices, such as programming preferences. Consequently, one or more kinds of content management message 140 may be inserted into program stream 102 prior to its adaptation by segmenter 105 for distribution over communication network 104. It is noted that although client systems 108a and 108b are depicted as personal computers (PCs), in FIG. 1, one or both of client systems 108a and 108b may be implemented as any IP compatible device with display capabilities, such as a smartphone, a digital media player, a personal digital assistant (PDA), a tablet or other portable computer, or a gaming console, for example.

Figure 2:
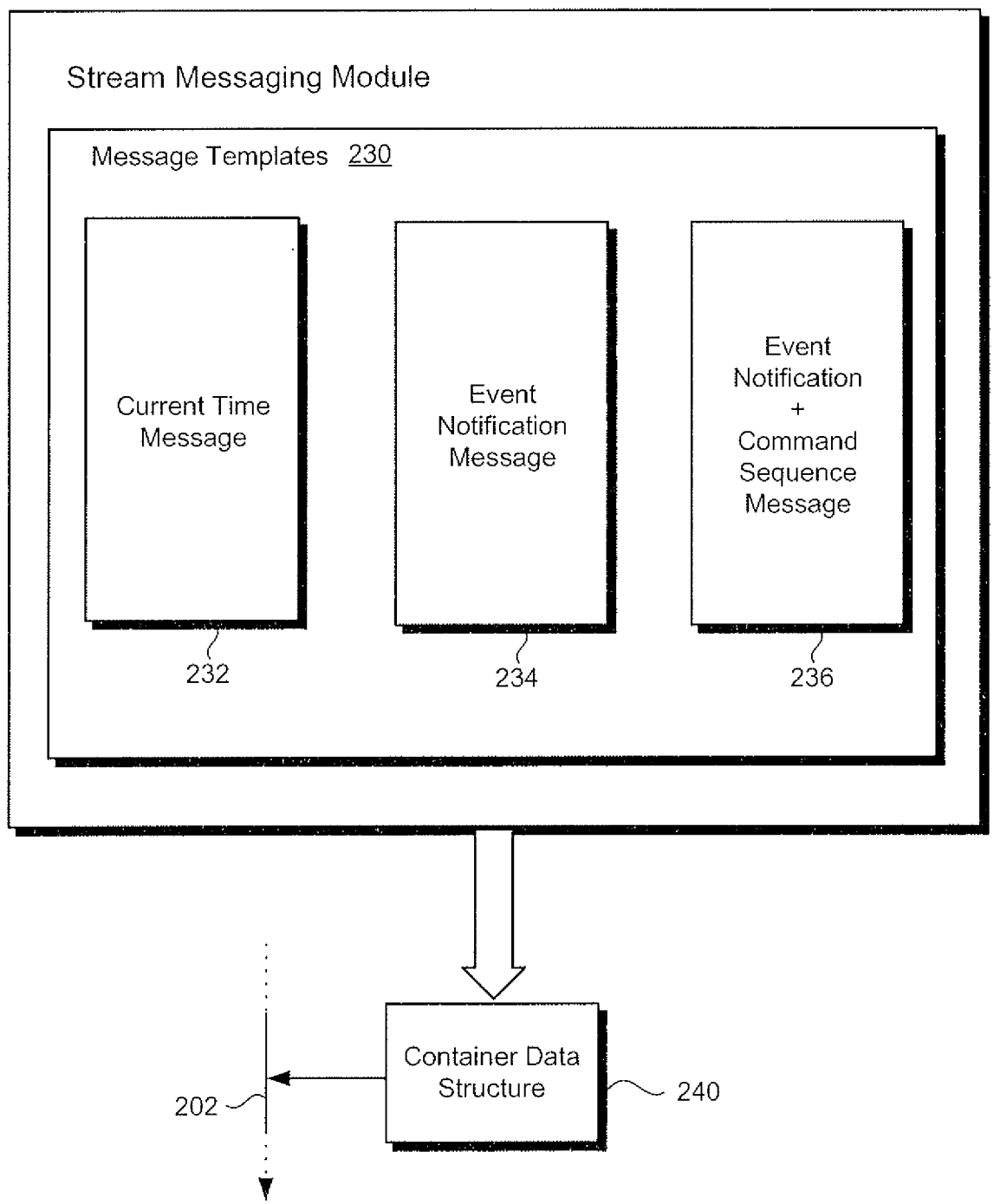
FIG. 2 shows a more detailed representation of a stream messaging module suitable for use in the system of FIG. 1, according to one implementation.

Referring to FIG. 2, FIG. 2 shows a more detailed representation of a stream messaging module suitable for use in the system of FIG. 1, according to one implementation. As shown in FIG. 2, stream messaging module 220 includes message templates 230 in the form of current time message template 232, event notification message template 234, and event notification plus command sequence message template 236. As further shown in FIG. 2, stream messaging module 220 is configured to utilize message templates 230 to issue content management message 240 as a container data structure for insertion into program stream 202. Stream messaging module 220, content management message 240, and program stream 202 correspond respectively to stream messaging module 120, content management message 140, and program stream 102, in FIG. 1.

Current time message template 232 may be used by stream messaging module 120/220 of automation system 110 to issue content management message 140/240 including a time command as metadata. The time command may correspond to a time stamp generated by automation system 110 and providing the current Ancillary Time Code (ATC) time address at the origination point of program stream 102/202.

Referring to FIG. 3A, FIG. 3A shows first portion 332-1 of an exemplary content management message template in the form of current time message template 332, while FIG. 3B shows second portion 332-2 of exemplary current time message template 332. It is noted that current time message template 332 is represented as a container data structure, and more specifically a container data structure in compliance with American National Standards Institute (ANSI) and Society of Cable Telecommunications Engineers (SCTE) standard 104 (ANSI/SCTE 104). Current time message template 332 corresponds to current time message template 232, in FIG. 2.

The exemplary system embodied by FIG. 1 and FIG. 2, as well as exemplary current time message template 332 shown by FIGS. 3A and 3B, will now be further described by reference to FIG. 4, which presents flowchart 400 describing an example method for use by an automation system for issuing a content management message, e.g., a current time message, for use in a program stream. With respect to the method outlined in FIG. 4, it is noted that certain details and features have been left out of flowchart 400 in order not to obscure the discussion of the inventive features in the present application.

Figure 4:
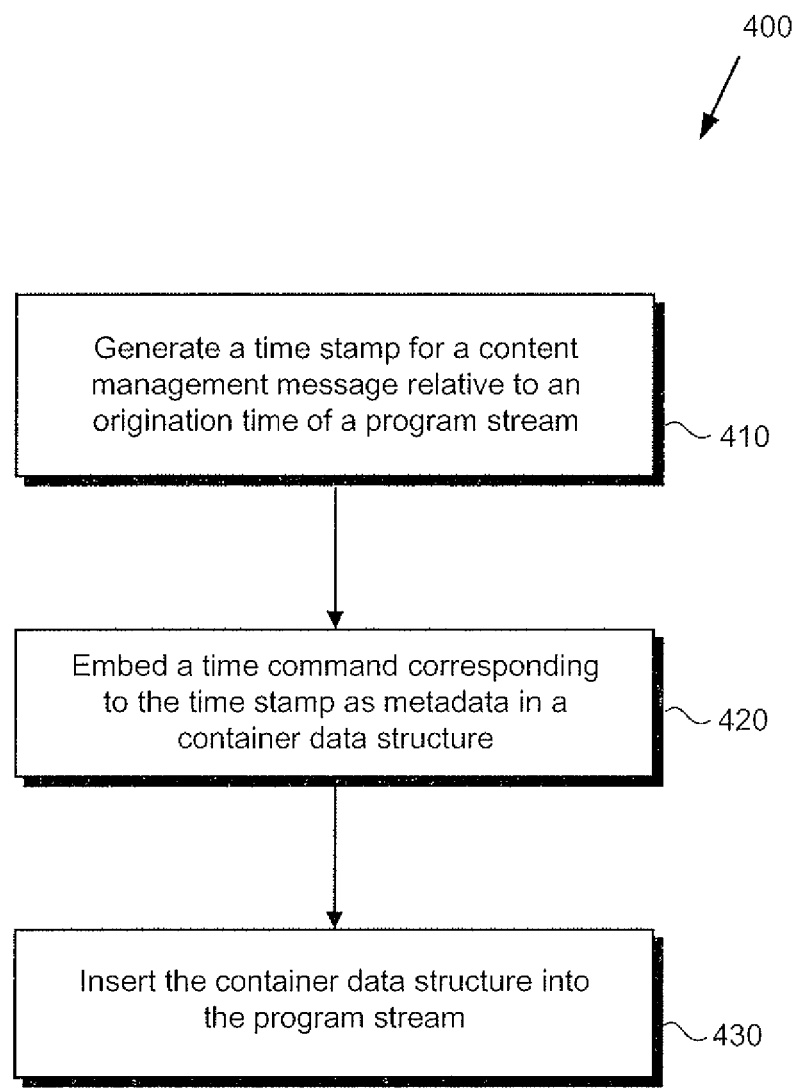
FIG. 4 is a flowchart presenting a method for issuing a content management message for use in a program stream, according to one implementation consistent with use of the exemplary content management message template of FIGS. 3A and 3B.

Referring to FIG. 4 in combination with FIGS. 1, 2, 3A, and 3B, flowchart 400 begins with generating a time stamp for content management message 140/240 relative to an origination time of program stream 102/202 (410). Generation of the time stamp can be performed by automation system 110, which, as shown in FIG. 1 is interactively connected to program stream provider 101. By virtue of such interactive connectivity, for example, automation system 110 may have access to timing information relating to program stream 102/202. Consequently, automation system 110 can be configured to generate a time stamp, such as the ATC time address at the origination point of program stream 102/202, as shown by time stamp metadata lines 25-30 of first portion 332-1 of current time message template 332, in FIG. 3A.

Flowchart 400 continues with embedding a time command corresponding to the time stamp as metadata in a container data structure (420). Embedding of a time command corresponding to the time stamp may be performed by automation system 110, through use of processor 112 and stream messaging module 120/220. As shown by FIGS. 3A and 3B for example, time stamp metadata lines 25-30 of first portion 332-1 and current time command line 10 of second portion 332-2 of current time message template 232/332 are embedded in the multiple operation message section of an ANSI/SCTE 104 container data structure, e.g., lines 12-33 of first portion 332-1 and lines 1-12 of second portion 332-2 of current time message template 332.

Flowchart 400 continues with inserting the container data structure into the program stream (430). Insertion of the container data structure corresponding to content management message 140/240 into program stream 102/202 may be performed by automation system 110 through use of an ANSI/SCTE 104 automation system to compression system communications applications program interface (API), for example, as known in the art. Content management message 140/240 produced using current time message template 232/332 may be unrelated to any specific programming event, but may be used to indicate that stream messaging module 120 is operational. Moreover, in some implementations, content management message 140/240 produced using current time message template 232/332 may be used to determine a delay resulting from the operation of stream messaging module 120, in order to provide presentation continuity for viewers 109a and 109b. That is to say, as seen by viewers 109a and 109b, respective channel streams 106a and 106b should present program elements that begin and end at natural breaks corresponding to program stream 102, and without "flash frame" or other undesirable effects.

Referring back to FIG. 2, event notification message template 234 may be used by stream messaging module 220 to issue content management message 240 including a time stamp and/or information regarding a program stream event as metadata. A program stream event may be any cognizable segment of program stream 202. For example, a program stream event may be an episode of programming content, a segment of such an episode, an advertisement, a consecutive series of advertisements (hereinafter "ad pod"), or a unit of promotional content. Information regarding such a program stream event may include identification of an event boundary corresponding to initiation of the program stream event and information describing the duration of the program stream event. Thus, a content management message produced using event notification message template 234 can be used to characterize discrete program events within program stream 202.

FIG. 5A shows first portion 534-1 of an exemplary content management message template in the form of event notification message template 534, while FIG. 5B shows second portion 534-2 of exemplary event notification message template 534. Event notification message template 534 corresponds to event notification message template 234, in FIG. 2. Moreover, like current time message template 332, shown by FIGS. 3A and 3B, event notification message template 534, in FIGS. 5A and 5B is represented as an ANSI/SCTE 104 container data structure.

Exemplary event notification message template 534 shown by FIGS. 5A and 5B will be further described by reference to FIG. 6, which presents flowchart 600 describing an example method for use by an automation system for issuing a content management message, e.g., an event notification message, for use in a program stream. With respect to the method outlined in FIG. 6, it is reiterated that certain details and features have been left out of the flowchart in order not to obscure the discussion of the inventive features in the present application.

Figure 6:
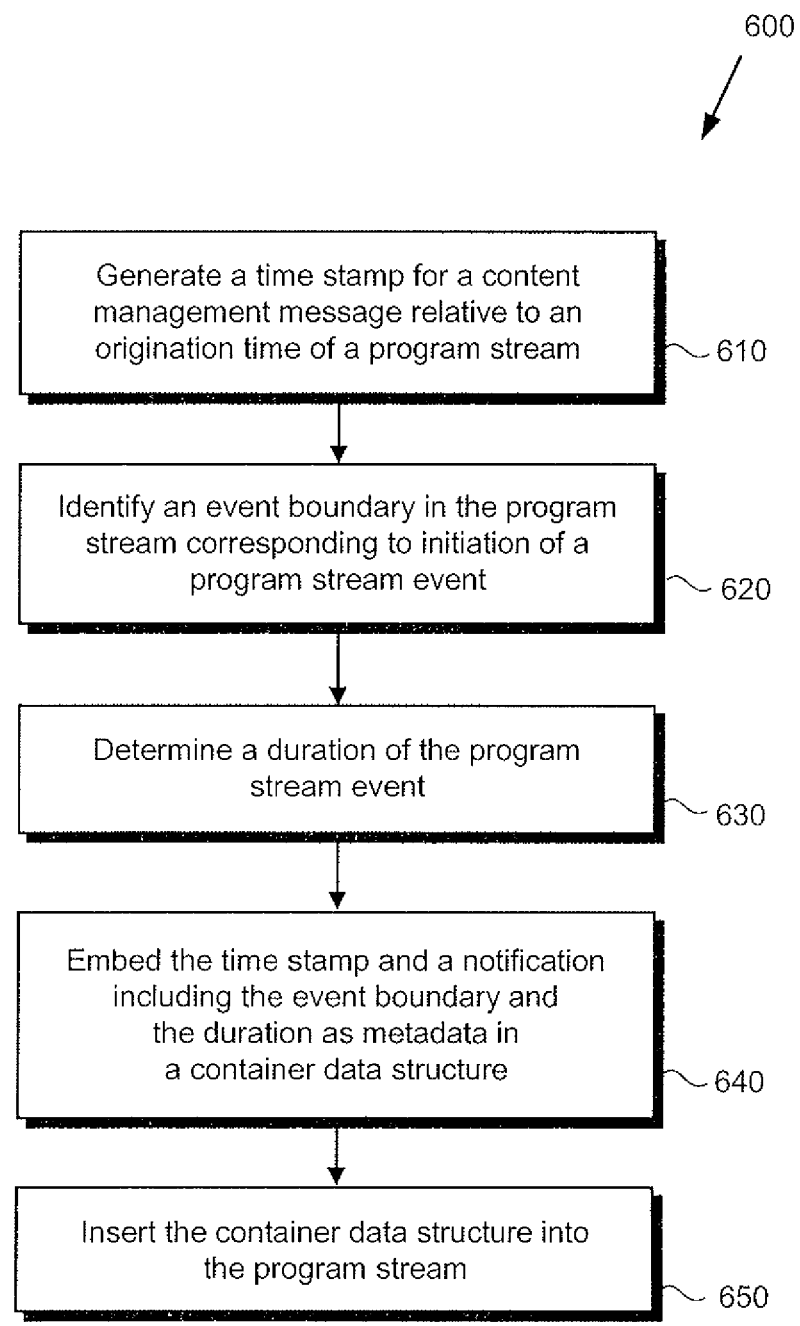
FIG. 6 is a flowchart presenting a method for issuing a content management message for use in a program stream, according to another implementation consistent with use of the exemplary content management message template of FIGS. 5A and 5B.

Referring to FIG. 6 in combination with FIGS. 1, 2, 5A, and 5B, flowchart 600 begins with generating a time stamp for content management message 140/240 relative to an origination time of program stream 102/202 (610). As described above, generation of the time stamp can be performed by automation system 110, which can be configured to generate an ATC time address at the origination point of program stream 102/202.

Flowchart 600 continues with identifying an event boundary in program stream 102/202 corresponding to initiation of a program stream event (620). As explained above, examples of a program stream event may include an episode of program content, a segment of such an episode, an advertisement or ad pod, or a unit of promotional content. Identification of the event boundary corresponding to initiation of the program stream event can be performed by automation system 110, which, as shown in FIG. 1 is interactively connected to program stream provider 101 and may thereby have access to program stream event information for program stream 102/202. Identification of the event boundary may include identification of a start time of the program stream event, or a video frame number or ATC time address corresponding to initiation of the program stream event. It is noted that on occasions when there is not an exact match to an existing time address, for any of a variety of possible reasons, stream messaging module 120 may be configured to identify the appropriate video frame corresponding to the event boundary. In implementations in which program stream 102/202 is provided as a 720p HD video stream, for example, the event boundary may begin with the first frame of the video frame pair having the specified ATC time address.

Flowchart 600 further describes determining a duration of the program stream event (630), which may also be performed by automation system 110. Determination of the duration of the program stream event may include determining the duration in terms of time lapse in hours and/or minutes and/or seconds, in terms of the number of video frames spanned by the program stream event, or in terms of the number of video frame pairs for implementations in which 720p HD video is provided.

Flowchart 600 continues with embedding the time stamp and a notification including the event boundary and the event duration as metadata in a container data structure (640). Embedding of the time stamp and the notification may be performed by automation system 110, through use of processor 112 and stream messaging module 120/220. As shown by FIGS. 5A and 5B for example, time stamp metadata lines 25-30 of first portion 534-1, program stream event start time metadata lines 18-21 of second portion 534-2, and program stream event duration metadata lines 23-26 of second portion 534-2 are embedded in the multiple operation message section of an ANSI/SCTE 104 container data structure, e.g., lines 12-31 of first portion 534-1 and lines 1-33 of second portion 534-2 of event notification message template 534.

Flowchart 600 concludes with inserting the container data structure into the program stream (650). Insertion of the container data structure corresponding to content management message 140/240 into program stream 102/202 may be performed by automation system 110 through use of an ANSI/SCTE 104 automation system to compression system communications API, as noted above. In one implementation, content management message 140/240 may be inserted into program stream 102/202 within a buffer interval, such as a time interval, of the event boundary corresponding to initiation of the program stream event to which content management message 140/240 applies. For example, such a buffer interval may be an interval of several seconds, such as 6 seconds, following the event boundary, thereby enabling issuance of content management message 140/240 after initiation of the program stream event to which content management message 140/240 applies.

Referring once again to FIG. 2, event notification plus command sequence message template 236 may be used by stream messaging module 220 to issue content management message 240 including information regarding a program stream event in combination with a command sequence for managing content within program stream 102/202. The command sequence included in such a content management message may authorize replacement of program stream content during a program stream event, such as replacement of an entire TV program or program episode by alternative programming, possibly identified by the command sequence. The alternative programming serving as the replacement content may include another TV program, another episode of the same TV program, a special event, or live feed content, for example.

In one implementation, content management message 140/240 can identify replacement content corresponding to a playlist of several content elements maintained within network 104. Alternatively, or in addition, replacement content may be identified dynamically by a separate authorized entity, such as authorized third party 107, utilizing business logic, for example. In one such implementation, the notification included as metadata in content management message 140/240 identifies program stream content preceding the event boundary to enable identification of appropriate replacement content. In other implementations, the notification may also identify program stream content following the program stream event being replaced.

Where more than one replacement is required (for example, if a one-hour program is to be replaced with two half-hour programs), several content management messages can be sent. Moreover, where replacement of a program stream event less than an entire episode of programming is authorized by the command sequence, the command sequence may further determine an offset interval for the replacement content, thereby enabling substantially seamless substitution by the replacement content at the appropriate time during the program stream event.

In one implementation, the command sequence may also be used to direct a return to the program stream either during playout of the replacement content or after the replacement of program stream content has completed playout. That is to say, a first content management message 140/240 produced using event notification plus command sequence message template 236 may cause program content not present in program stream 102/202 to be delivered to one or both of viewers 109a and 109b as replacement content in respective channel streams 106a and/or 106b. That first content management message could be followed by a second content management message 140/240, issued either during or at the end of playout of the replacement content, directing a return to program stream 102/202 and causing the content provided in the one or both of channel streams 106a and 106b affected by the first content management message to rejoin and conform to the content within program stream 102/202.

In another implementation, the command sequence included in such a content management message may authorize replacement of advertising or promotional content within content stream 102/202. In one such implementation, for example, the command 1o sequence may authorize replacement of an advertisement or entire ad pod, but not specify the replacement content to take its place, thereby enabling use of highly individualized IP based targeting tools to direct different advertisements to viewers 109a and 109b based on their respective viewer profiles. For instance, authorized third party 107 may collect or access information regarding the Internet browsing histories of client systems 108a and 108b and identify replacement advertising content presumptively of desirable to respective viewers 109a and 109b. As a result, channel streams 106a and 106b can provide program content substantially matching the program content in program stream 102/202 provided over broadcasting platform 103, while delivering personally targeted advertising to each of viewers 109a and 109b that may differ from advertising content provided with program stream 102/202 over broadcasting platform 103.

FIG. 7A shows first portion 736-1 of an exemplary content management message template in the form of event notification plus command sequence message template 736, while FIGS. 7B and 7C show respective second portion 736-2 and third portion 736-3 of exemplary event notification plus command sequence message template 736. Event notification plus command sequence message template 736 corresponds to event notification plus command sequence message template 236, in FIG. 2, and authorizes replacement of advertising content within program stream 102/202. Like current time message template 332, shown by FIGS. 3A and 3B, and event notification message template 534, shown by FIGS. 5A and 5B, event notification plus command sequence message template 736 in FIGS. 7A, 7B, and 7C is represented as an ANSI/SCTE 104 container data structure.

Exemplary event notification plus command sequence message template 736 shown by FIGS. 7A, 7B, and 7C will be further described by reference to FIG. 8, which presents flowchart 800 describing an example method for use by an automation system for issuing a content management message, e.g., in this instance an event notification plus command sequence message, for use in a program stream. With respect to the method outlined in FIG. 8, it is once again reiterated that certain details and features have been left out of the flowchart in order not to obscure the discussion of the inventive features in the present application.

Figure 8:
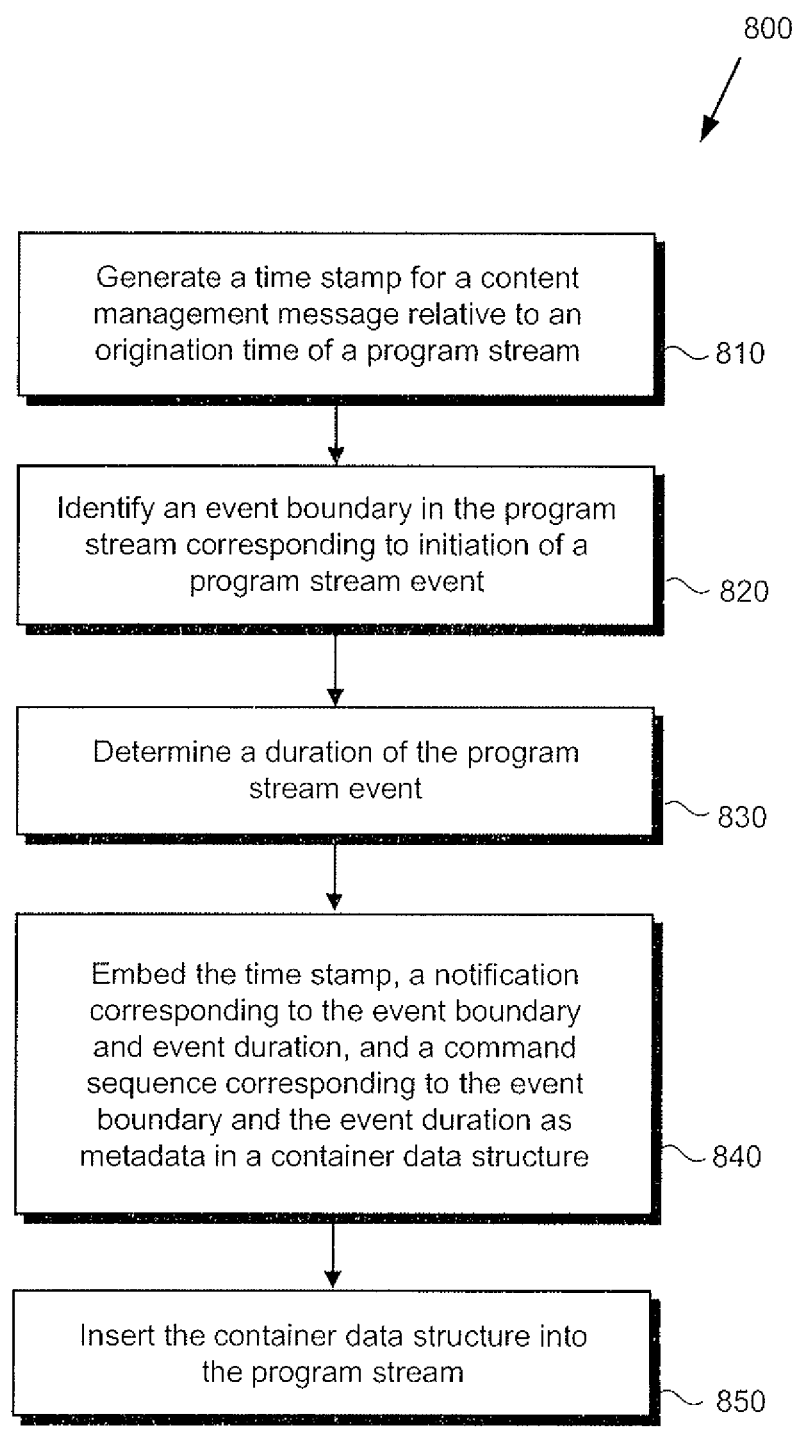
FIG. 8 is a flowchart presenting a method for issuing a content management message for use in a program stream, according to yet another implementation consistent with use of the exemplary content management message template of FIGS. 7A, 7B, and 7C.

Referring to FIG. 8 in combination with FIGS. 1, 2, 7A, 7B, and 7C, flowchart 800 begins with generating a time stamp for content management message 140/240 relative to an origination time of program stream 102/202 (810). As described above, generation of the time stamp can be performed by automation system 110, which can be configured to generate an ATC time address at the origination point of program stream 102/202.

Flowchart 800 continues with identifying an event boundary in program stream 102/202 corresponding to initiation of a program stream event (820), followed by determining a duration of the program stream event (830). Identification of the event boundary and determination of the event duration may be performed by automation system 110, as described above in relation to the similar operations, i.e., (620) and (630), respectively, discussed in conjunction with flowchart 600, in FIG. 6.

Flowchart 800, in FIG. 8, continues with embedding the time stamp, a notification corresponding to the event boundary and the event duration, and a command sequence corresponding to the event boundary and the event duration as metadata in a container data structure (840). That embedding may be performed by automation system 110, through use of processor 112 and stream messaging module 120/220. As shown by FIGS. 7A, 7B, and 7C for example, time stamp metadata lines 25-30 of first portion 736-1, program stream event start time metadata lines 18-21 of second portion 736-2, program stream event duration metadata lines 23-26 of second portion 736-2, and command sequence metadata lines 10-16 of third portion 736-3 are embedded in the multiple operation message section of an ANSI/SCTE 104 container data structure.

Flowchart 800 concludes with inserting the container data structure into the program stream (850). Insertion of the container data structure corresponding to content management message 140/240 into program stream 102/202 may be performed by automation system 110, as described above in relation to the similar operation, i.e., (650) presented in FIG. 6. Moreover, and as explained above, in one implementation, content management message 140/240 may be inserted into program stream 102/202 within a buffer interval, such as a delay time interval, of the event boundary corresponding to initiation of the program stream event to which content management message 140/240 applies. For example, such a buffer interval may be an interval of several seconds, such as 6 seconds, following the event boundary, thereby enabling issuance of content management message 140/240 including a command sequence after initiation of the program stream event to which the command sequence applies.

It is noted that in some implementations, it may be desirable to enable a manual override of content management message 140/240 after its insertion into program stream 102/202. In such implementations, automation system 110 may be configured such that a monitoring entity has authority to selectively block execution of a command sequence contained within content management message 140/240. For example, a human operator monitoring program stream 102/202 may be able to manually override a predetermined replacement of program stream content, or to prevent a predetermined return to program stream 102/202 during or after such a replacement.

FIGS. 9A, 9B, and 9C, show exemplary event notification plus command sequence message template 936 authorizing replacement of program content within program stream 102/202. FIG. 9A, shows first portion 936-1 of event notification plus command sequence message template 936, while FIGS. 9B and 9C show respective second portion 936-2 and third portion 936-3 of exemplary event notification plus command sequence message template 936. Event notification plus command sequence message template 936 corresponds to event notification plus command sequence message template 236, in FIG. 2, and, like event notification plus command sequence message template 736 in FIGS. 7A, 7B, and 7C, is represented as an ANSI/SCTE 104 container data structure.

As shown by FIGS. 9A, 9B, and 9C, time stamp metadata lines 25-30 of first portion 936-1, program stream event start time metadata lines 18-21 of second portion 936-2, program stream event duration metadata lines 23-26 of second portion 936-2, and command sequence metadata lines 10-29 of third portion 936-3 are embedded in the multiple operation message section of an ANSI/SCTE 104 container data structure. It is to be noted that, in addition to authorizing replacement of program content, command sequence metadata lines 20-26 of third portion 936-3, shown in FIG. 9C, determine an offset interval for the replacement program content specified by command sequence metadata lines 28 and 29 of third portion 936-3.

Referring now to FIGS. 10A, 10B, and 10C, those figures show exemplary event notification plus command sequence message template 1036 directing a return to program stream 102/202. FIG. 10A, shows first portion 1036-1 of event notification plus command sequence message template 1036, while FIGS. 10B and 10C show respective second portion 1036-2 and third portion 1036-3 of exemplary event notification plus command sequence message template 1036. Event notification plus command sequence message template 1036 corresponds to event notification plus command sequence message template 236, in FIG. 2, and, like event notification plus command sequence message templates 736 and 936 is represented as an ANSI/SCTE 104 container data structure.

As shown by FIGS. 10A, 10B, and 10C, time stamp metadata lines 25-30 of first portion 1036-1, program stream event start time metadata lines 18-21 of second portion 1036-2, program stream event duration metadata lines 23-26 of second portion 1036-2, and command sequence metadata line 10 of third portion 1036-3 are embedded in the multiple operation message section of an ANSI/SCTE 104 container data structure and provide information enabling channel streams 106*a* and 106*b* to rejoin program stream 102/202.

Thus, from the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method comprising:
   broadcasting a linear TV program stream via a cable or a satellite network;
   concurrently with the broadcasting of the linear TV program stream via the cable or the satellite network:
   provisioning the linear TV program stream for streaming over a packet network;
   generating a command sequence;
   dynamically inserting the command sequence into the provisioned linear TV program stream; and
   providing the provisioned linear TV program stream including the inserted command sequence over the packet network to a third party;
   wherein the inserted command sequence authorizes the third party to remove at least one of an advertising content, a promotional content and a program content from the provisioned linear TV program stream, and replace the at least one of the advertising content, the promotional content and the program content with a replacement content provided by the third party to generate a modified program stream for streaming over the packet network for individually targeted distribution;
   wherein the inserted command sequence directs a return to the provisioned linear TV program stream during a playout of the replacement content and prior to completion of the playout of the replacement content.

2. The method of claim 1 further comprising:
   identifying an event boundary in the linear TV program stream corresponding to initiation of a program stream event; and
   determining a duration of the program stream event;
   wherein the inserting embeds a notification corresponding to the event boundary and the duration into the provisioned linear TV program stream.

3. The method of claim 2, wherein the inserting is performed into the provisioned linear TV program stream within a buffer interval of the event boundary.

4. The method of claim 2, wherein the notification identifies at least one of the program content preceding the program stream event and the program content following the program stream event.

5. The method of claim 1, wherein the command sequence provides an offset interval for the inserting.

6. A system configured to broadcast a linear TV program stream via a cable or a satellite network, the system comprising:
   a processor, wherein concurrently with the broadcasting of the linear TV program stream by the system via the cable or the satellite network, the processor is configured to:
   provision the linear TV program stream for streaming over a packet network;
   generate a command sequence;
   dynamically insert the command sequence into the provisioned linear TV program stream; and
   provide the provisioned linear TV program stream including the inserted command sequence over the packet network to a third party;
   wherein the inserted command sequence authorizes the third party to remove at least one of an advertising content, a promotional content and a program content from the provisioned linear TV program stream, and replace the at least one of the advertising content, the promotional content and the program content with a replacement content provided by the third party to generate a modified program stream for streaming over the packet network for individually targeted distribution;
   wherein the inserted command sequence directs a return to the provisioned linear TV program stream during a playout of the replacement content and prior to completion of the playout of the replacement content.

7. The system of claim 6, wherein the system is further configured to identify an event boundary in the linear TV program stream corresponding to initiation of a program stream event, and to determine a duration of the program stream event, and wherein the inserting embeds a notification corresponding to the event boundary and the duration into the provisioned linear TV program stream.

8. The system of claim 7, wherein the inserting is performed into the provisioned linear TV program stream within a buffer interval of the event boundary.

9. The system of claim 7, wherein the notification identifies at least one of the program content preceding the program stream event and the program content following the program stream event.

10. The system of claim 6, wherein the command sequence provides an offset interval for the inserting.

11. The method of claim 1, wherein the inserted command sequence directing the return to the provisioned linear TV program stream is dynamically inserted into the provisioned linear TV program stream during the playout of the replacement content and prior to completion of the playout of the replacement content.

12. The system of claim 6, wherein the inserted command sequence directing the return to the provisioned linear TV program stream is dynamically inserted into the provisioned linear TV program stream during the playout of the replacement content and prior to completion of the playout of the replacement content.

* * * * *